United States Patent
Inoue et al.

(10) Patent No.: US 12,154,003 B2
(45) Date of Patent: *Nov. 26, 2024

(54) PHASE-ROBUST MATCHED KERNEL ACQUISITION FOR QUBIT STATE DETERMINATION

(71) Applicant: International Business Machines Corporation, Armonk, NY (US)

(72) Inventors: Ken Inoue, Elmsford, NY (US); Maika Takita, Croton-on-Hudson, NY (US); Antonio Corcoles-Gonzalez, Mount Kisco, NY (US); Scott Douglas Lekuch, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/183,602

(22) Filed: Mar. 14, 2023

(65) Prior Publication Data

US 2024/0013077 A1    Jan. 11, 2024

Related U.S. Application Data

(63) Continuation of application No. 16/677,178, filed on Nov. 7, 2019, now Pat. No. 11,636,372.

(51) Int. Cl.
*G06N 10/60* (2022.01)
*G06F 17/16* (2006.01)
(Continued)

(52) U.S. Cl.
CPC ............. *G06N 10/00* (2019.01); *G06F 17/16* (2013.01); *G06F 18/2411* (2023.01); *G06N 10/20* (2022.01)

(58) Field of Classification Search
CPC ........ G06N 10/00; G06N 10/20; G06N 10/60; G06N 20/10; G06N 10/40; G06F 17/16; G06F 18/2411; G06V 10/766
See application file for complete search history.

(56) References Cited

U.S. PATENT DOCUMENTS

| 6,128,764 | A  | 10/2000 | Gottesman |
| 8,175,273 | B2 | 5/2012  | Kawamoto et al. |

(Continued)

FOREIGN PATENT DOCUMENTS

| CN | 107609816 A | 9/2017 |
| CN | 10940952 A  | 10/2018 |
| CN | 109067530 A | 10/2018 |

OTHER PUBLICATIONS

Non-Final Office Action received for U.S. Appl. No. 16/677,178 dated Aug. 4, 2022, 36 pages.

(Continued)

*Primary Examiner* — Nghia M Doan
(74) *Attorney, Agent, or Firm* — Amin, Turocy & Watson, LLP

(57) ABSTRACT

Systems, computer-implemented methods, and computer program products that can facilitate determining a state of a qubit are described. According to an embodiment, a system can comprise a memory that stores computer executable components and a processor that executes the computer executable components stored in the memory. The computer executable components can comprise an output receiving component that can receive, in response to a request, output representative of a quantum state of a qubit of a quantum computing device, and a classifying component that classifies the quantum state of the qubit of the quantum computing device based on the output representative of the quantum state of the qubit. The system can further include a config- (Continued)

uring component that can configure the classifying component based on a characteristic of the request.

15 Claims, 8 Drawing Sheets

(51) Int. Cl.
   *G06F 18/2411* (2023.01)
   *G06N 10/00* (2022.01)
   *G06N 10/20* (2022.01)

(56) References Cited

U.S. PATENT DOCUMENTS

| | | | |
|---|---|---|---|
| 8,995,650 B2 | 3/2015 | Gisin et al. | |
| 9,355,364 B2 | 3/2016 | Miller et al. | |
| 11,387,913 B2* | 7/2022 | Innes | H04L 9/0833 |
| 11,636,372 B2* | 4/2023 | Inoue | G06F 17/16 |
| | | | 706/62 |
| 2019/0019102 A1 | 1/2019 | Babbush et al. | |
| 2019/0095811 A1 | 3/2019 | Antonio et al. | |
| 2020/0342345 A1* | 10/2020 | Farhi | G06N 3/084 |

OTHER PUBLICATIONS

Notice of Allowance received for U.S. Appl. No. 16/677,178 dated Dec. 16, 2022, 18 pages.
Rebenstrost et al., (Quantum Support Vector Machine for Big Data Classification, Sep. 25, 2014, American Physical Society, pp. 1-5) (Year: 2014).
Nasio et al., (Kernel-based classification using quantum mechanics, Pattern Recognition 40 (2007), pp. 875-889) (Year: 2007).
Ryan, et al. "Tomography via correlation of noisy measurement records." Phys. Rev. A 91, 022118, Feb. 20, 2015, 7 pages.
Salathe, et al. "Low-Latency Digital Signal Processing for Feedback and Feedforward in Quantum Computing and Communication." Phys. Rev. Applied 9, 034011 (2018), 23 pages.
Ryan, et al. "Hardware for Dynamic Quantum Computing." arXiv:1704.08314v1 [quant-ph] Apr. 26, 2017, 13 pages.
List of IBM Patents or Applications Treated as Related.

* cited by examiner

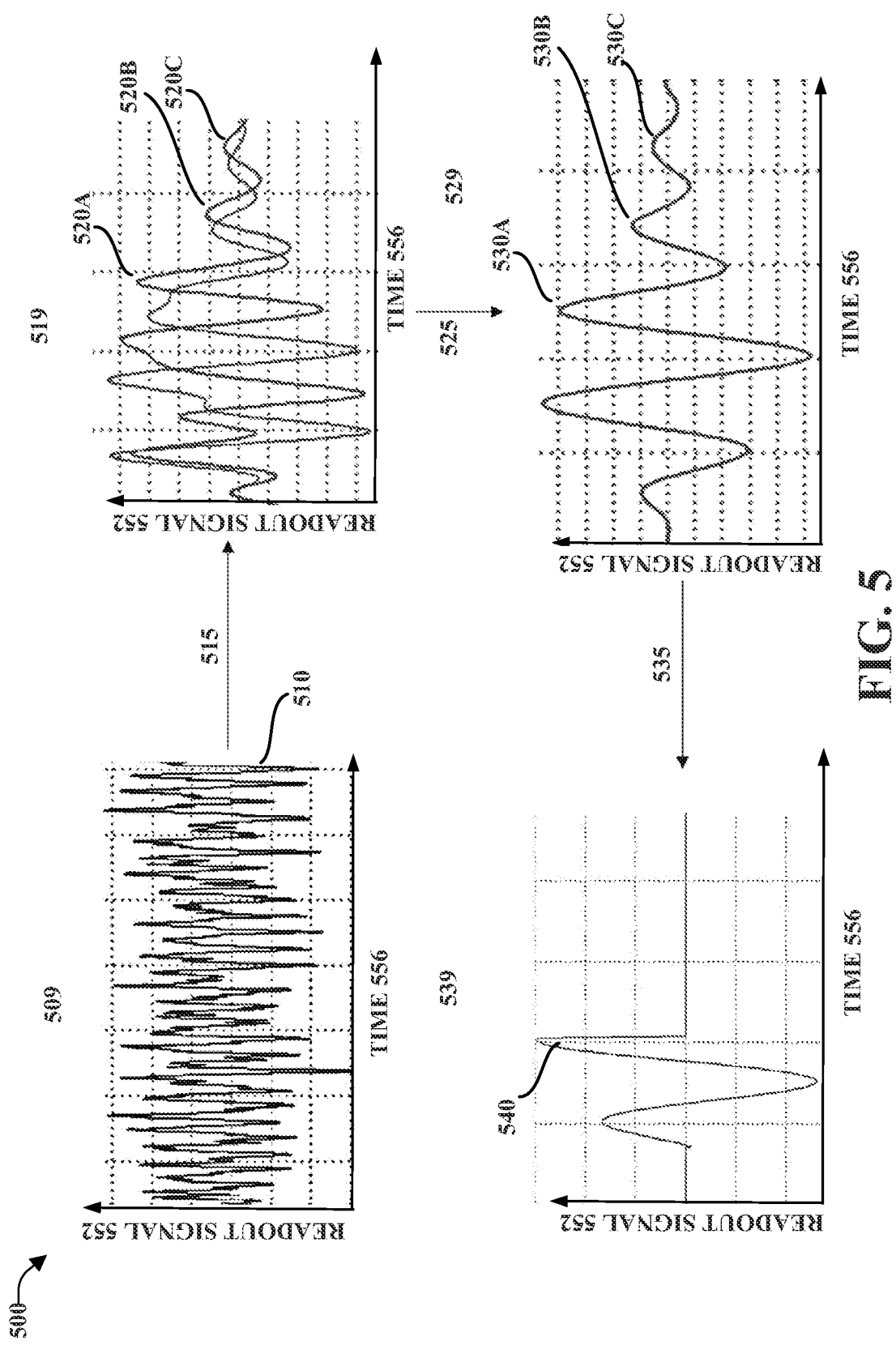

PHASE-ROBUST MATCHED KERNEL ACQUISITION FOR QUBIT STATE DETERMINATION

STATEMENT REGARDING FEDERALLY SPONSORED RESEARCH OR DEVELOPMENT

This invention was made with Government support under W911NF-16-0114 awarded by Intelligence Advanced Research Projects Activity (IARPA). The Government has certain rights to this invention.

BACKGROUND

The subject disclosure relates to quantum computing, and more specifically, phase-robust matched kernel acquisition for qubit state determination for quantum computing devices.

SUMMARY

The following presents a summary to provide a basic understanding of one or more embodiments of the present disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, and/or computer program products can facilitate determining a state of a qubit in a quantum computing device.

According to an embodiment, a system can comprise a memory that stores computer executable components and a processor that executes the computer executable components stored in the memory. The computer executable components can comprise an output receiving component that can receive, in response to a request, output representative of a quantum state of a qubit of a quantum computing device. The system can further include a classifying component that can classify the quantum state of the qubit of the quantum computing device based on the output representative of the quantum state of the qubit. The system can further include a configuring component that can configure the classifying component based on a characteristic of the request.

According to another embodiment, a computer-implemented method can comprise receiving, by a system operatively coupled to a processor, in response to a request, output representative of a quantum state of a qubit of a quantum computing device. The method can further include classifying, by the system, the quantum state of the qubit of the quantum computing device based on the output representative of the quantum state of the qubit. The method can further include configuring, by the system, the classifying the quantum state based on a characteristic of the request.

According to another embodiment, a computer program product can facilitate determining a state of the qubit, the computer program product comprising a computer readable storage medium having program instructions embodied therewith, the program instructions executable by a processor to cause the processor to receive, by the processor, in response to a request, output representative of a quantum state of the qubit of a quantum computing device, and classify, by the processor, the quantum state of the qubit of the quantum computing device based on the output representative of the quantum state of the qubit. The computer program product can further include instructions to configure, by the processor, the classifying based on a characteristic of the request.

DESCRIPTION OF THE DRAWINGS

FIG. 5 illustrates an example of a transformation of output into different patterns that can be used by classifying component to determine the state of qubit based on requests of different phases, in accordance with one or more embodiments.

DETAILED DESCRIPTION

Figure 1:
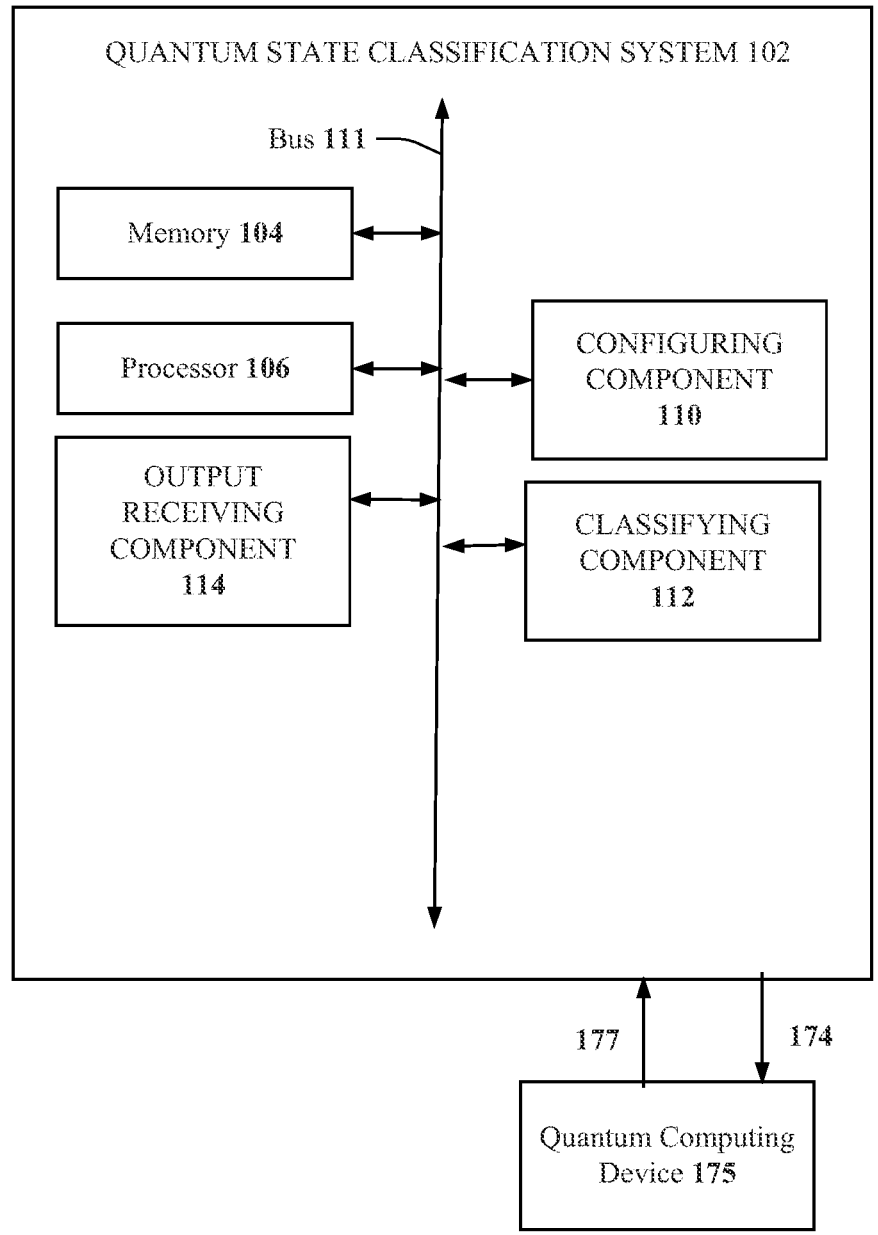
FIG. 1 illustrates a block diagram of an example, non-limiting system that can facilitate quantum state classification in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Quantum computing is generally the use of quantum-mechanical phenomena for the purpose of performing computing and information processing functions, e.g., quantum computing can employ quantum physics to encode and process information, rather than binary digital techniques based on transistors. That is, while classical computers can operate on bit values that are either 0 or 1, quantum computers operate on quantum bits that (qubits) can comprise superpositions of both 0 and 1, can entangle multiple quantum bits (qubits), and use interference to affect other qubits. Quantum computing has the potential to solve problems that, due to their computational complexity, cannot be solved, either at all or for all practical purposes, by a classical computer.

The superposition principle of quantum mechanics allows qubits to be in a state that can be described by a linear combination of the 0 and 1 states of the qubit. The entanglement principle of quantum physics can facilitate allowing qubits to be correlated with each other such that the combined states of the qubits cannot be factored into individual qubit states. For instance, a state of a first qubit can depend on a state of a second qubit. As such, a quantum circuit can employ qubits to encode and process information in a manner that can be significantly different from binary digital techniques based on transistors.

As discussed in more detail with FIG. 2 below, in one or more embodiments, quantum state classification system 102 can receive output indicative of a state of a qubit of quantum computing device 175 based on a signal reflected off a readout resonator 230. In response to the signal, in one or more embodiments, components of quantum computing device 175 can return a signal having a pattern, and this signal can be transformed and evaluated to determine a state of components of quantum computing device 175. One reason for the transformation is because the return signal can vary based on the phase of the request signal, and one or more embodiments transforms the return signal based on the phase of the request signal.

Generally speaking, one or more embodiments can read out the state of a supercomputing qubit by determining a state of a qubit based on a request signal communicated to the qubit, and a phase of the request signal. It should be noted that different approaches described herein can be generally applicable to different classes of qubits, including different classes of superconducting qubits.

FIG. 1 illustrates a block diagram of an example 100, non-limiting system 102 that can facilitate determining a state of a qubit based on a request signal communicated to the qubit, and a phase of the request signal, in accordance with one or more embodiments described herein.

According to multiple embodiments, quantum computing device 175 can comprise one or more quantum devices including, but not limited to, a quantum computer, a quantum processor, a quantum simulator, quantum hardware, a quantum chip (e.g., a superconducting circuit fabricated on a semiconducting device), one or more qubits of a quantum chip, and/or another quantum device.

It should be appreciated that the embodiments of the subject disclosure depicted in various figures disclosed herein are for illustration only, and as such, the architecture of such embodiments are not limited to the systems, devices, and/or components depicted therein. For example, in some embodiments, quantum state classification system 102 can further comprise various computer and/or computing-based elements described herein with reference to operating environment 800 and FIG. 8. For example, in some embodiments, quantum state classification system 102 can further comprise memory 104, processor 106, and/or bus 111. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and instruction(s). For example, memory 104 can store computer and otherwise machine readable, writable, and/or executable components and/or instructions that, when executed by processor 106, can facilitate execution of the various functions described herein relating to quantum state classification system 102, variational component 110, and any other components associated with quantum state classification system 102 as described herein, with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), erasable programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or a combination of different central processing units, multi-core processors, microprocessors, dual microprocessors, microcontrollers, Systems on a Chip (SOC), array processors, vector processors, and any other type of processor. Further examples of processor 106 are described below with reference to processing unit 814 and FIG. 8. Such examples of processor 106 can be employed to implement any embodiments of the subject disclosure.

In some embodiments, elements of quantum state classification system 102, including, but not limited to memory 104, processor 106, configuring component 110, classifying component 112, output receiving component 114, and/or another component of quantum state classification system 102 as described herein, can be communicatively, electrically, and/or operatively coupled to one another via bus 111 to perform functions of quantum state classification system 102, and any other components coupled therewith. In several embodiments, bus 111 can comprise one or more of a memory bus, memory controller, peripheral bus, external bus, local bus, or another type of bus that can employ various bus architectures. Further examples of bus 111 are described below with reference to system bus 818 and FIG. 8. Such examples of bus 111 can be employed to implement any embodiments of the subject disclosure.

In some embodiments, quantum state classification system 102 can comprise any type of component, machine, device, facility, apparatus, and/or instrument that comprises a processor and/or can be capable of effective and/or operative communication with a wired and/or wireless network. All such embodiments are envisioned. For example, quantum state classification system 102 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia player, and/or another type of device.

In some embodiments, quantum state classification system 102 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, quantum state classification system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, quantum state classification system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLU-ETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, quantum state classification system 102 can thus include hardware (e.g., a central processing unit (CPU), a transceiver, a decoder), software (e.g., a set of threads, a set of processes, software in execution) or a combination of hardware and software that facilitates communicating information between quantum state classification system 102 and external systems, sources, and/or devices (e.g., computing devices, communication devices, etc.).

According to multiple embodiments, quantum state classification system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with quantum state classification system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, configuring component 110, classifying component 112, output receiving component 114, and/or any other components associated with quantum state classification system 102 as disclosed herein (e.g., communicatively, electronically, and/or operatively coupled with and/or employed by quantum state classification system 102), can comprise such computer and/or machine readable, writable, and/or executable component(s) and/or instruction(s). Consequently, according to numerous embodiments, quantum state classification system 102 and/or any components associated therewith as disclosed herein, can employ processor 106 to execute such computer and/or machine readable, writable, and/or executable component(s) and/or instruction(s) to facilitate performance of one or more operations described herein with reference to quantum state classification system 102 and/or any such components associated therewith.

For example, in one or more embodiments, output receiving component 114 can receive, in response to a request, output representative of a quantum state of a qubit of quantum computing device 175. Further, classifying component 112 can classify the quantum state of the qubit of quantum computing device 175 based on the output representative of the quantum state of the qubit. Further, configuring component 110 can configure classifying component 112 based on a characteristic of the request.

In some embodiments, system 102 can be associated with various technologies. For example, system 102 can be associated with classical computing technologies, quantum computing technologies, classical reinforcement learning technologies, quantum reinforcement learning technologies, classical artificial intelligence (AI) model technologies, quantum AI model technologies, classical machine learning (ML) model technologies, quantum ML model technologies, cloud computing technologies, Internet-of-Things (IoT) technologies, and/or other technologies.

Figure 2:
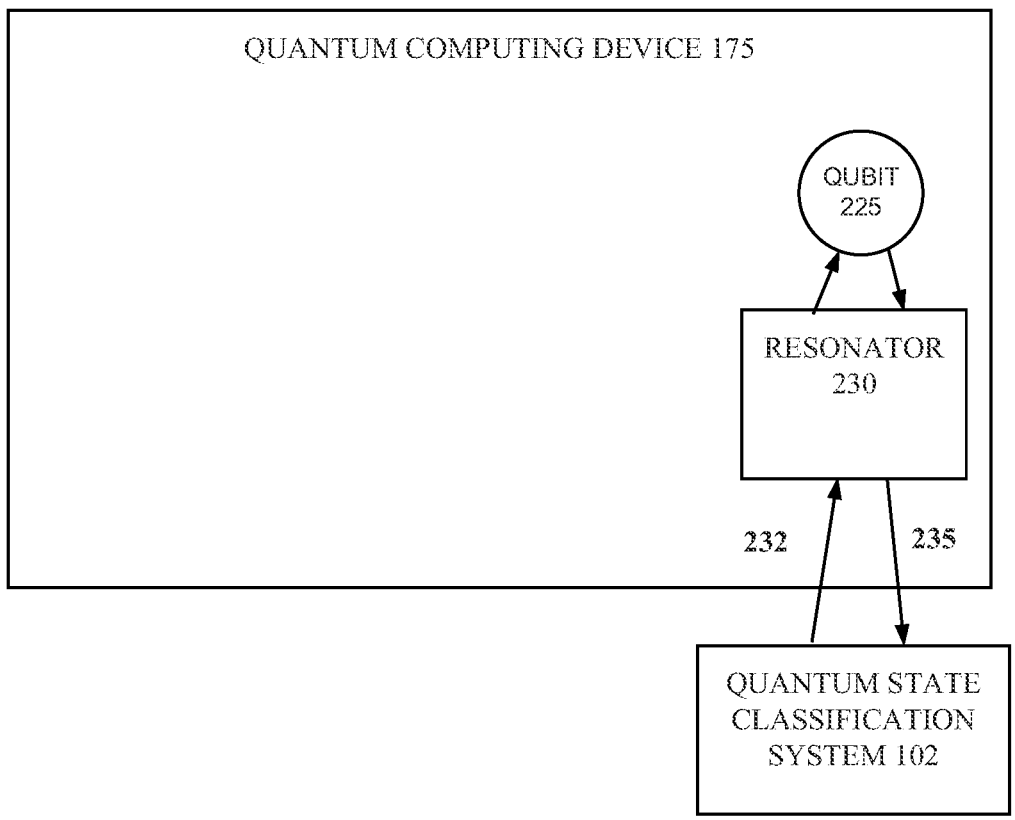
FIG. 2 illustrates a diagram of an example quantum computing device communicatively coupled to quantum state classification system, in accordance with one or more embodiments.
Figure 3:
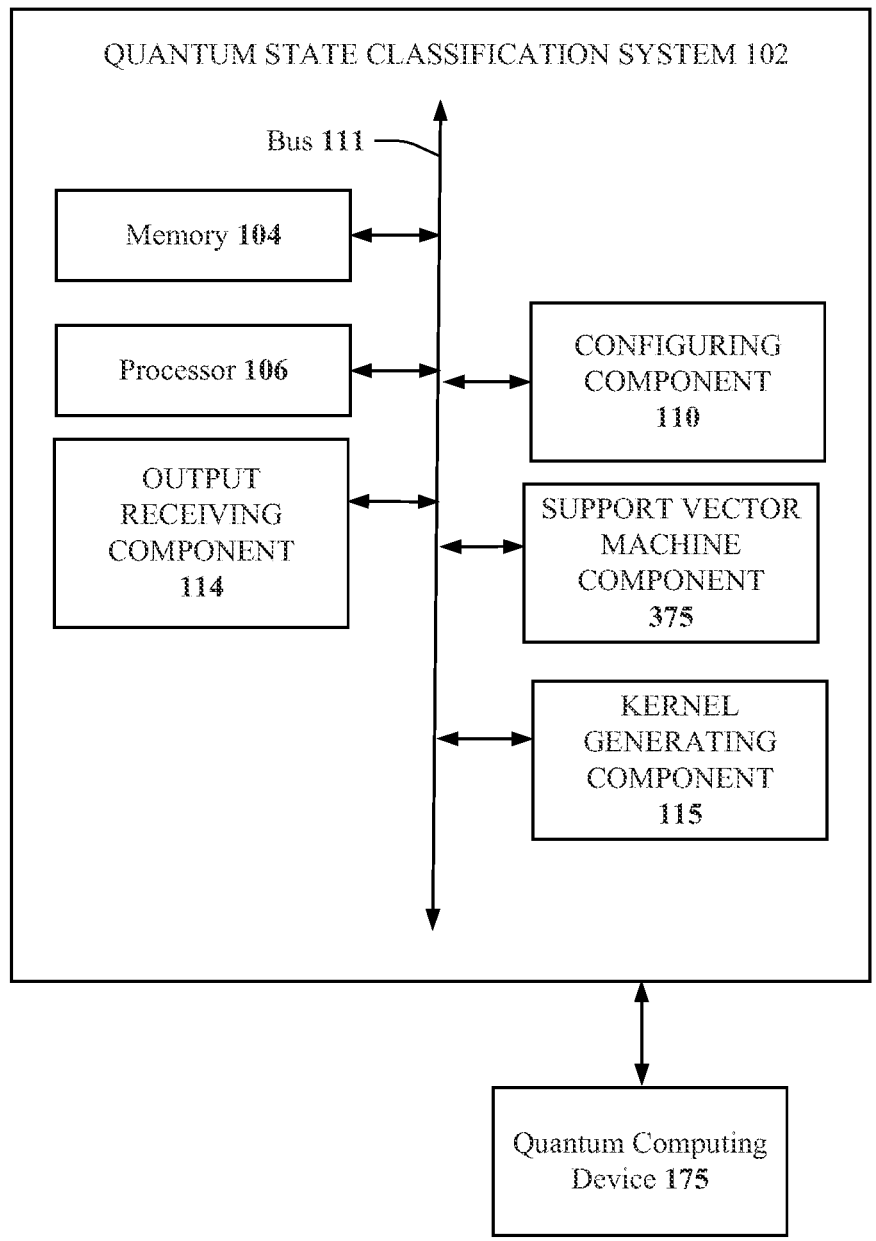
FIG. 3 illustrates a block diagram of an example, non-limiting system 102 that can facilitate quantum state classification in accordance with one or more embodiments described herein.

Discussed below, FIG. 2 depicts a more detailed view of quantum computing device 175 along with a detailed discussion of request signal 232 directed to quantum computing device 175, and output signal 235 received from quantum computing device 175. FIGS. 3 and 5 provide a discussion of the configuring, by configuring component 110, of the classification processes of classifying component 112, in accordance with one or more embodiments. To illustrate some of the processes described herein, FIGS. 5-6B depict example output signals from quantum computing device 175 as well as an example operation of classifying component 112.

FIG. 2 illustrates a diagram of an example 200 quantum computing device communicatively coupled to quantum state classification system 102, in accordance with one or more embodiments. Repetitive description of like elements and/or processes employed in respective embodiments is omitted for sake of brevity.

As depicted, example 200 can include quantum computing device 175, quantum state classification system 102, kernel storage 450, and kernel generator 410. Quantum computing device 175 can include resonator 230 coupled to qubit 225 such that resonator 230 has a response to request signal 232 that depends on the state of the qubit. In one or more embodiments, resonator 230 can receive request signal 232 from quantum state classification system 102 and generate output signal 235. Resonator 230 output signal 235 to kernel generator 410 and quantum state classification system 102, for kernel generation and output signal 235 classification, respectively.

In one or more embodiments, request signal 232 can be an RF signal selected to cause resonator 230 to generate output signal 235, with output signal 235 being indicative of the state of qubit 225. It should be noted that, as described above, one or more embodiments can provide different approaches to determine which state for qubit 225 that output signal 235 indicates. Different implementations can be used to generate request signal 232, including, but not limited to, generating a square pulse signal that can be modulated by an intermediate frequency (IF) carrier having a frequency, for example, 10-20 MHz. Further, the request signal 232 can be combined with a signal from a RF local oscillator, with the resulting signal being configured to match the readout frequency of output 235 generated by resonator 230. It should be noted that, in one or more embodiments, the phase of request signal 232 can be stored and used for classification of the received output signal 235 by quantum state classification system 102. In one or more embodiments, by employing the RF local oscillator to process request signal 232 signal, a phase of request signal 232 can be measured for further use.

It should be noted that this example is non-limiting with respect to the operations of resonator 230, with the generation and communication of request signal 232 being able to be performed by different components that would be known by one having skill in the relevant art(s), given the disclosure herein.

In one or more embodiments, based on characteristics of qubit 225, a resonance output signal 235 can be produced by resonator 230 and classified by quantum state classification system 102. In one or more embodiments, the output signal 235 is produced by resonator 230 with characteristics that are based, in part, on the phase of request signal 232 described above. One or more embodiments herein describe different approaches to interpreting output signal 235 based on this request phase variability.

Once received by quantum state classification system 102, output signal 235 can be down-converted, e.g., by the same RF local oscillator used to generate request signal 232, or using different components. In one or more embodiments, to facilitate the determining of which state that output signal 235 is indicative of, the phase of request signal 232 (e.g., as a characteristic of request signal 232) can be communicated, along with output signal 235 to quantum classifying system 102 for a classification of the quantum state of qubit 225, e.g., by classifying component 112. In one or more embodiments, output receiving component 114 can receive, output signal 235, produced by qubit 225 in output signal 235 in response to request signal 232 of resonator 230, output representative of a quantum state of a qubit of a quantum computing device.

As discussed further below, in one or more embodiments, classifying component 112 can classify the quantum state of the qubit 225 based on the content of output signal 235 (e.g., example content depicted in FIG. 5, discussed below) and the characteristic of request signal 232, e.g., the phase of request signal 232, as noted above. One way that classifying component 112 can classify output signal 235 is to have configuring component 110 use the phase received from resonator 230 to configure classifying component 112 for classification based on the phase of request signal 232. As discussed further with FIG. 5 below, one reason to use configuring component 110 to configure classifying component 112 is because classifying component 112 can use an artificial intelligence approach to classification, e.g., with different kernel functions used for the classifying process. As discussed with FIG. 3 below, in one or more embodiments, classifying component 112 can comprise a support vector machine, with transformations performed by the support vector machine based on kernels of instructions. As used with descriptions herein, a kernel is a non-linear transformation to an original space of data that moves the data to a higher-dimensionality space where the classification can be performed linearly. For example, in one or more embodiments, a non-linear transformation can be selected based on the phase of the request signal, and this transformation can move the data to a higher-dimensionality space where classification can be performed linearly. Different approaches to the different parts of this example are discussed below, e.g., selecting a kernel, transforming based on the kernel, and interpreting the transformed return signal.

In one or more embodiments, a configuring component 110 can configure classifying component 112 by using the phase characteristic of request signal 232 to select a kernel for configuration of classifying component 112. Different criteria used to select from existing kernels as well as approaches to generating kernels based on criteria are discussed below.

One approach that can be used in one or more embodiments can transform the down-converted output signal 235 by employing the selected kernel values, e.g., by multiplying output signal 235 value by kernel values. In this example, converted signals can accumulate in real time. The final integrated results can be compared with a stored threshold for the phase characteristic and a state of qubit 225 can be determined, e.g., quantum states |0> or |1>. In one or more embodiments, the binary result can be outputted, e.g., on external port and/or FPGA register/memory.

In one or more embodiments, multiple measurements of a state of qubit 225 can be taken, e.g., at different points in time, potentially very close together. One reason that measurements can be advantageously taken close in time to other measurements is, for example, to receive measurements from resonator 230 describing the state of qubit 225 during coherence time of qubit 225.

FIG. 3 illustrates a block diagram of an example 300, non-limiting system 102 that can facilitate quantum state classification in accordance with one or more embodiments described herein. Repetitive description of like elements and/or processes employed in respective embodiments is omitted for sake of brevity. In some embodiments, example 300 can comprise a quantum state classification system 102, resonator 230 and quantum computing device 175. In some embodiments, quantum state classification system 102 can comprise configuring component 110, support vector machine component 375, output receiving component 114, kernel generating component 115, and any other components associated with quantum state classification system 102 as disclosed herein.

As noted above in one or more embodiments, based on the phase characteristic of request signal 232, configuring component 110 can configure classifying component 112 to classify the state of qubit 225. In a variation of the embodiments of classifying component 112, this component can comprise a support vector machine component 375. As would be appreciated by one having skill in the relevant art(s), given the description herein, support vector machine component 375 can be configured (e.g., with kernel separation functions) to separate two groups of data points into different classifications, e.g., quantum states |0> or |1>. In implementations based on the embodiments described above, configuring component can select from a transformation kernel based on the phase characteristic of request signal 232. It should be noted that, as described further below, not only can kernels be selected from existing kernels for qubit 225, they can also be generated (e.g., by kernel generating component 115).

As would further be appreciated by one having skill in the relevant art(s), different approaches, both using AI and not using AI, can be used to separate the data of the output signal 235 into corresponding states of qubit 225.

Figure 4:
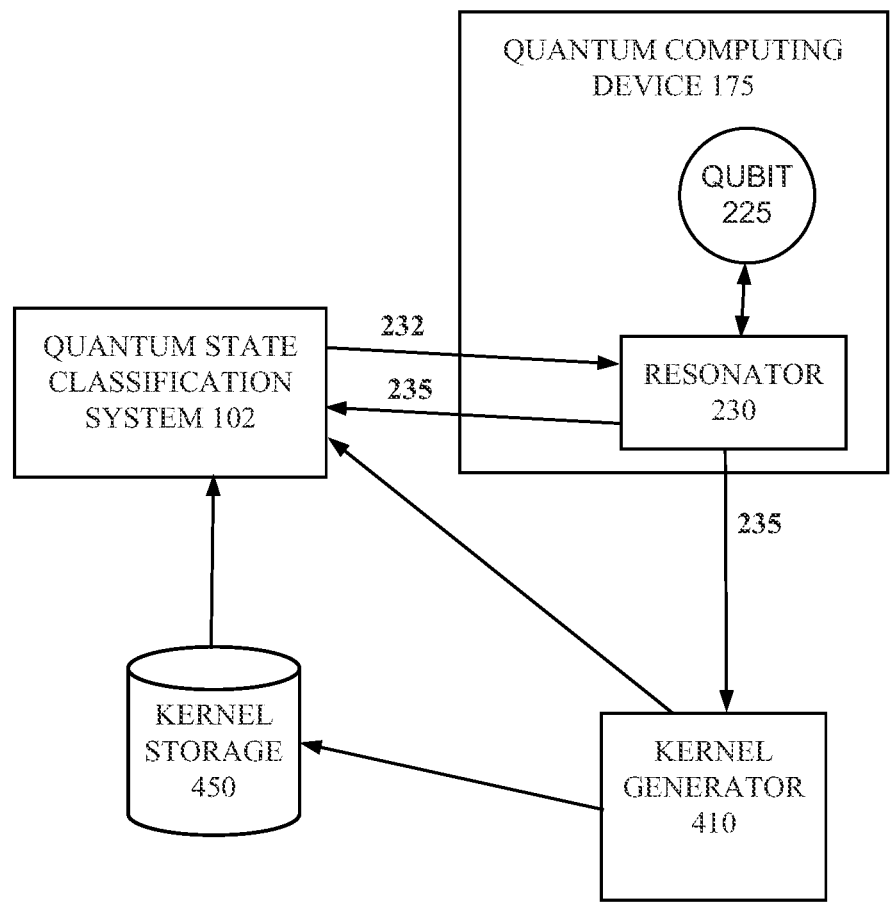
FIG. 4 illustrates a block diagram of an example, non-limiting system that can facilitate determining a state of a qubit based on a request signal communicated to the qubit, and a phase of the request signal, in accordance with one or more embodiments described herein.

FIGS. 4-5 depict example processed signals and processing components that can be employed by one or more embodiments described herein. With these figures, three different sample approaches to quantum state classification that can be used by one or more embodiments, are described. In the example approaches, output signal 235 can be received (e.g., by output receiving component 114) by quantum state classification system 102, along with phase data corresponding to the phase of request signal 232. Each example embodiment differs in how output signal 235 is classified.

In first example approach, based on the phase data, a pre-existing kernel is selected from kernel storage 450. As discussed with FIG. 5 below, the generation of this kernel can be performed by kernel generator 410, e.g., by an example process shown in FIG. 5, and stored in kernel storage 450 for use. In the second and third example approaches discussed below, a pre-existing kernel specifically for the phase data can be unavailable. Based on this unavailability of a pre-existing kernel, in these examples a kernel for the phase data can generated based on one or more pre-existing kernels, e.g., stored in kernel storage 450.

FIG. 4 illustrates a block diagram of an example, non-limiting system 400 that can facilitate quantum state classification, in accordance with one or more embodiments described herein. Repetitive description of like elements and/or processes employed in respective embodiments is omitted for sake of brevity. In some embodiments, system 400 can comprise quantum computing device, kernel generator 410, kernel storage 450, and quantum state classification system 102. Quantum computing device 175 can include resonator 230 coupled to qubit 225 such that resonator 230 has a response to request signal 232 that depends on the state of the qubit.

It should be noted that kernel storage 450 can be similar to memory 104 in that it can be comprised of RAM or other memory structure. In one or more embodiments, kernel storage can be comprised of field programmable gate arrays (FPGAs) to facilitate high speed processing of qubit data.

In the first example, in some implementations, in advance of output signal 235 being received by output receiving component 114, one or more kernels corresponding to different phases can be generated and stored in kernel storage 450. Being able to interpret output signal 235 using individually captured and calibrated of kernels for different phases depends, in some circumstances, on a kernel for a specific request signal 232 phase for this kernel already being generated, e.g., available in storage 450 for use to configure classifying component 112. One approach to having kernels available for different phases is to generate a sample request at a sample phase for resonator 230 with sample results interpreted and used to generate a kernel for the sample phase. An example process by which kernels can be generated from sample requests is described with FIG. 5 below. As discussed with additional examples below, stored kernels for different phases can be employed for other situations, e.g., for times when an exact phase match with a pre-existing kernel is not available.

Continuing this example, when a request signal 232 to resonator 230 uses the same phase as the sample phase described above the kernel generated for this phase can be used. In an example of this approach, request signal 232, having a phase of, for example, 50 degrees (e.g., as provided by RF local oscillator that generated the request signal 232), can be communicated by quantum state classification system 102 to resonator 230. In response to request signal 232, resonator 230 can produce output signal 235, which can be processed (e.g., analog to digital conversion) and communicated to quantum classification system 102, e.g., received by output receiving component 114. In this example, configuring component 110, can use the request phase data (e.g., 50 degrees) to retrieve the kernel generated as described above. In one or more embodiments, by employing this kernel, configuring component 110 can configure classifying component 112, or support vector machine component 375 of FIG. 3, to determine the state of qubit 225 by output signal 235 produced by resonator 230 at the time request signal 232 was used.

In another example implementation, using a variation of the example above, an example request signal 232 phase corresponds to a value for which a pre-generated kernel is not stored in kernel storage 450, e.g., 52 degrees. In this example, to provide a kernel for the configuration of classifying component 112, one or more embodiments can select a kernel from kernel storage 450 that has a phase value different from the current request value, e.g., the 50 degree kernel from the previous example can be selected because it is available. Based on this kernel, classifying component 112 can time shift output signal 235 (e.g., from 52 degrees to 50 degrees) so as to facilitate the use of the 50 degree phase kernel for classifying of the 52 degree phase output signal 235 received. With respect to this approach, in one or more embodiments, an example resonator 230 (reflecting the state of qubit 225) that can be subject to this approach can be considered a resonator 230 that can require a long readout time compared to resonator 230 decay time, and that can be asymptotically resolved to a constant amplitude sine wave. Based in part on this qubit type, in this example, a kernel with a different phase value (e.g., the 50 degree kernel from the previous example) can be selected, and the values of this kernel can be shifted in time so that it matches the required 52 degree kernel.

Another example approach can be advantageously by one or more embodiments, including, but not limited to, an occasion where the phase of request signal 232 does not correspond to phases of any kernels available for use classifying output signal 235 (e.g., as described in the first example approach above), or an occasion where kernels don't have characteristics that enable use of other approaches, e.g., this third approach can be advantageous where the measured qubit 225 is not a resonator 230 that can require a long readout time compared to resonator 230 decay time, e.g. as described with the second example approach discussed above.

In this approach, kernels for two phases (a, b) of a measurement intermediate frequency (IF) carrier can be captured and calibrated, with phases (a, b) selected, by one or more embodiments, such that $\sin(a+b) \neq 0$. In one or more embodiments, these kernels can be generated dynamically for each measurement in an experiment from the current phase (x) of request signal 232 (e.g., the readout carrier) and the two phases (a, b). As described in further detail below, one approach to this dynamic kernel generation that can be employed by one or more embodiments can use sine interpolation factors, e.g., $(\sin(b-x)/\sin(a+b), \sin(x-a)/\sin(a+b))$.

In this example, assume the matched kernels for phases (a, b) are of the form $A(t)\sin(wt+a)$, where: (w) is an IF carrier frequency; (t) is discrete time unit from start of measurement; and (a) is the phase of the IF carrier. Given two kernels $K(t, a) = \{A(t)\sin(wt+a) \mid t=0, \ldots, n-1\}$ and K(t,b), one or more embodiments can calculate K(t, x) for arbitrary (x), provided sin(a+b) !=0. This is illustrated by equation #1 and equation #2, included below $$K(t,a) = K(t, x+(a-x))  \quad \text{Equation \#1}$$

$$K(t,b) = K(t, x+(b-x))  \quad \text{Equation \#2}$$

In this example, the right portions of equation #1 and equation #2 above can be expressed (e.g., by trigonometry formulas) by a linear combination of sin/cos(wt+x), sin/cos (a−x) and sin/cos(b−x), multiplied by K(t). To simplify this equation, the cos(wt+x) terms can be eliminated in the two expressions, resulting in equation #3, included below:

$$\sin(wt+x)\sin(a+b) = \sin(wt+a)\sin(b-x) + \sin(wt+b)\sin(x-a) \quad \text{Equation \#3}$$

Simplifying equation #3 can yield the following kernel interpolation formula, included as equation #4 below:

$$K(t, x) = \frac{(K(t, a)\sin(b - x) + K(t, b)\sin(x - a))}{\sin(a + b)} \quad \text{Equation \#4}$$

if $\sin(a + b) != 0$

In one or more embodiments, when tested against qubit data, the above approach can be good to within variations across measurements. In some circumstances, this approach can be advantageously selected to measure qubits 225 coupled to fast readout, with an output signal 235 that does not have time to resolve to a constant amplitude sine wave, such as kernel after range optimization 539 discussed below with FIG. 5.

FIG. 5 illustrates an example 500 of a transformation of output signal 235 into different patterns that can be used by classifying component 112 to determine the state of qubit 225 based on request signal 232 of different phases, in accordance with one or more embodiments. Repetitive description of like elements and/or processes employed in respective embodiments is omitted for sake of brevity.

Example 500 depicts four charts, where readout signal 552 is charted over time 556. In an example, readout signal 552 can be a down-converted raw signal 509, e.g., corresponding to a down-converted readout signal output signal 235 produced by qubit 225 in response to request signal 232 and communicated by resonator 230. In one or more embodiments, down-converted raw signal 509 can be provided to classifying component 112 for classification. In other embodiments, before communication to classifying component 112, the readout signal can be processed by an analog to digital converter.

In one or more embodiments, as depicted by averaged signals 519, down-converted raw signal 509 can be averaged for further analysis by classifying component 112. Continuing the processing, signal difference 529 can be generated by taking the difference between the averaged measurements for qubit 225 in alternating |0> and |1> states. In one or more embodiments, the signal values can be integrated (e.g., multiplying and accumulating) against down-converted raw signals 509.

In transition 535 depicted, histograms and cumulative distribution functions can be determined for a sample set of each state, e.g., by performing multiple runs for each state, such as, for example 10,000 runs for each state. In one or more embodiments, based on this approach, a range optimized kernel can be generated, e.g., kernel after range optimization 539 curve depicted in FIG. 5. In some implementations, this range optimized kernel can provide separation between |0> and |1> sets above a threshold, e.g., a maximum separation, or a value similar to the maximum separation. Additional embodiments can determine an optimal (start, stop) range for a kernel, based on different considerations. For example, one or more embodiments can determine ranges for a kernel that can improve noise suppression. In another example, one or more embodiments can determine ranges for a kernel that can improve the speed of different determinations described herein, including, but not limited to range optimizations, discussed above.

Figure 6A:
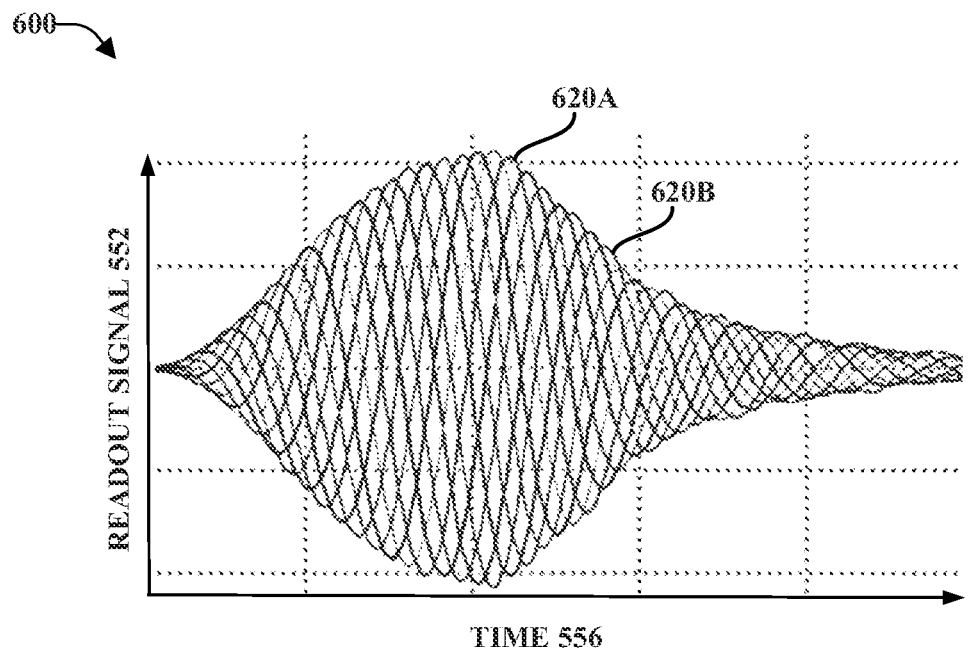
FIGS. 6A-6B illustrate example measurements that can be collected for a resonator coupled to a qubit, stored, and used by one or more embodiments to facilitate classifying the state of the qubit.
Figure 6B:
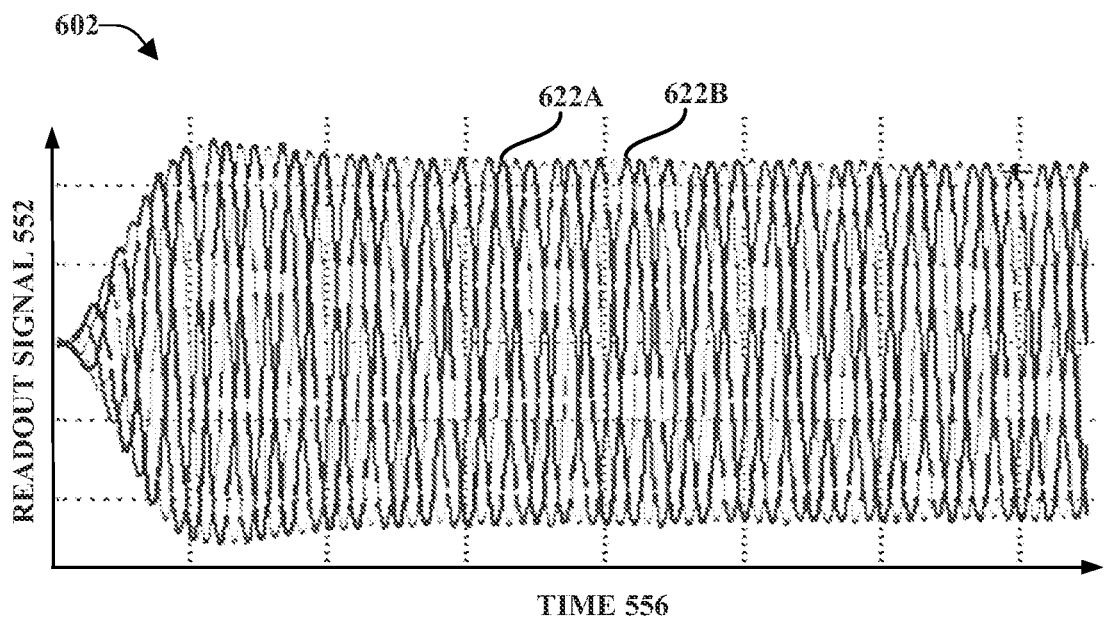

FIGS. 6A-6B illustrate example measurements 600 and 602 that can be collected for resonator 230, stored, and used by one or more embodiments to facilitate classifying the state of qubit 225. Repetitive description of like elements and/or processes employed in respective embodiments is omitted for sake of brevity.

As noted above, one or more embodiments can take measurements and generate kernels that can be used to classify a state of a qubit, e.g., qubit 225. As discussed with FIGS. 1-4 above, generated kernels can be stored for use in storage 450.

Charted measurements 600 and 602, depicted in FIGS. 6A-6B respectively, are readout signals 552 charted over time 556, and intended to be generally descriptive of a collection of multiple measurements at different points in time. For example, in some implementations, multiple measurements (e.g., 620A-B in FIG. 6A) can be measured at different points in time 556, with FIG. 6A being an example of a short-measurement pulse, e.g., with measurements very close together. One reason this short-measurement pulse can be used is to increase the number of measurements that can be taken within a coherence time for qubits subject to measurement. For illustrative purposes, FIG. 6B provides a high-level example of a collection of measurements (e.g., 622A-B) with a longer measurement pulse. It should be noted that the measurements as depicted are not necessarily phase aligned, and kernels can shift phase following the IF carrier phase of a measurement pulse.

Figure 7:
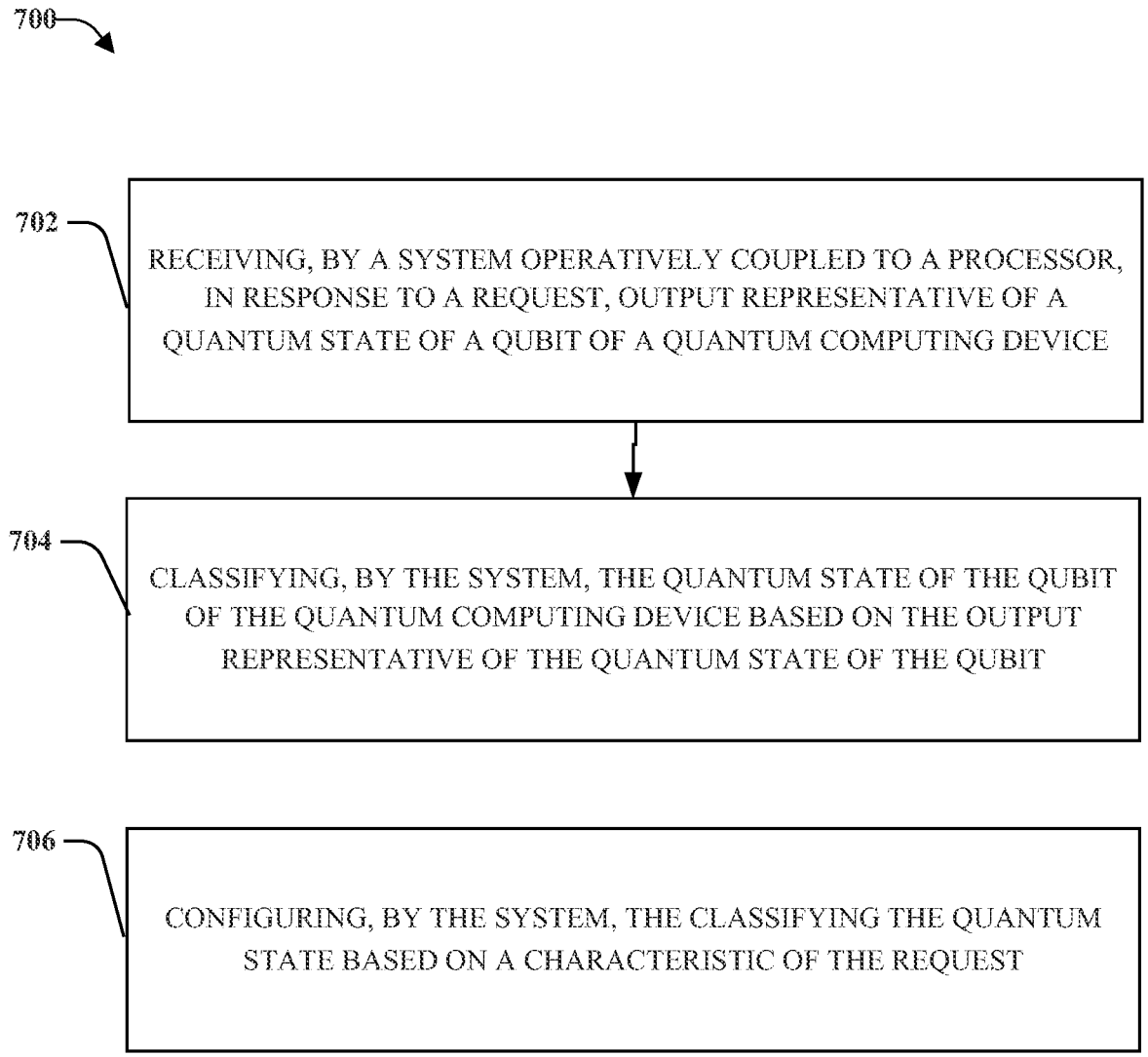
FIG. 7 illustrates a flow diagram of an example, non-limiting computer-implemented method that can facilitate determining a state of a qubit based on a request signal communicated to the qubit, and a phase of the request signal, in accordance with one or more embodiments described herein.

FIG. 7 illustrates a flow diagram of an example, non-limiting computer-implemented method 700 that can facilitate determining a state of a qubit, in accordance with one or more embodiments described herein.

At 702, method 700 can comprise receiving, by a system operatively coupled to a processor, in response to a request, output representative of a quantum state of a qubit of a quantum computing device. For example, in an embodiment, method 700 can comprise receiving, by a system operatively coupled to a processor, in response to a request, output representative of a quantum state of a qubit of a quantum computing device.

At 704, method 700 can comprise, classifying, by the system, the quantum state of the qubit of the quantum computing device based on the output representative of the quantum state of the qubit. For example, in an embodiment, method 700 can comprise classifying, by the system, the quantum state of the qubit of the quantum computing device based on the output representative of the quantum state of the qubit.

At 706, method 700 can comprise configuring, by the system, the classifying the quantum state based on a characteristic of the request. For example, in an embodiment, method 700 can comprise configuring, by the system, the classifying the quantum state based on a characteristic of the request.

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
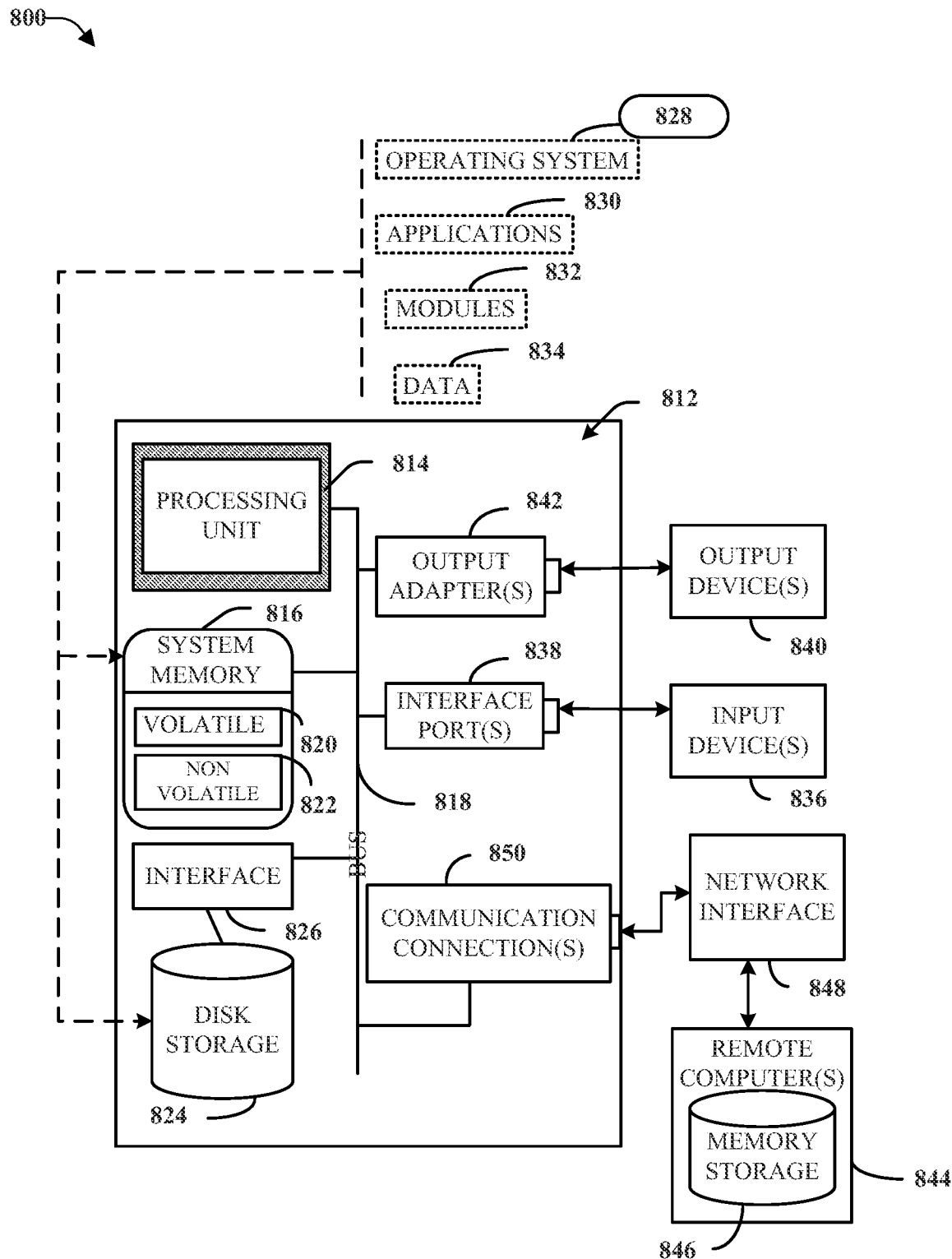
FIG. 8 illustrates a block diagram of an example, non-limiting operating environment in which one or more embodiments described herein can be facilitated.

FIG. 8 can provide a non-limiting context for the various aspects of the disclosed subject matter, intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      an output receiving component that receives, in response to a request signal, an output signal representative of a quantum state of a qubit;
      a classifying component that is configured based on a characteristic of the request signal and that classifies the quantum state of the qubit based on the output signal;
      a kernel generating component that generates kernels for storage in a kernel storage; and
      wherein the classifying component is configured to employ a kernel from the kernel storage to generate a transformed output, wherein the kernel comprises a phase value that corresponds to a phase of the request signal.

2. The system of claim 1, wherein the classifying component:
   transforms the output signal based on a configuration of the classifying component, resulting in transformed output; and
   classifies the quantum state of the qubit based on the transformed output.

3. The system of claim 1, wherein the classifying component is configured to receive the kernel from the kernel storage to generate a transformed output, wherein the kernel comprises a phase value that does not correspond to a phase of the request signal, and
   the classifying component time shifts values of the kernel, resulting in a time shifted kernel having a phase value that corresponds to the phase of the request signal.

4. The system of claim 3, wherein the classifying component is configured to employ the time shifted kernel.

5. The system of claim 1, wherein the classifying component is configured to receive a first kernel with a first phase value that does not correspond to a phase of the request signal and a second kernel with a second phase value that does not correspond to the phase of the request signal from the kernel storage, wherein the sine of the combination of a first phase of the first phase value and a second phase of the second phase value does not equal zero, and
   the classifying component generates third kernel based on the first kernel, the second kernel, and sine interpolation factors of the first phase and the second phase, wherein a phase value of the third kernel corresponds to the phase of the request signal.

6. The system of claim 5, wherein the classifying component is configured to employ the third kernel.

7. A computer-implemented method, comprising:
   receiving, by a system, in response to a request signal, an output signal representative of a quantum state of a qubit;
   classifying, by the system, the quantum state of the qubit based on the output signal and a configuration determined by a characteristic of the request signal;
   generating, by the system, kernels for storage in a kernel storage; and
   employing a kernel from the kernel storage to generate a transformed output, wherein the kernel comprises a phase value that corresponds to a phase of the request signal.

8. The method of claim 7, wherein the classifying the quantum state comprises:
   transforming, by the system, the output signal based on the configuration determined by a characteristic of the request signal, resulting in transformed output; and
   classifying, by the system, the quantum state of the qubit based on the transformed output.

9. The method of claim 7, further comprising:
   receiving, by the system, the kernel from the kernel storage to generate a transformed output, wherein the kernel comprises a phase value that does not correspond to a phase of the request signal, and
   time shifting, by the system, values of the kernel, resulting in a time shifted kernel comprising a phase value that corresponds to the phase of the request signal.

10. The method of claim 9, further comprising:
    employing, by the system, the time shifted kernel.

11. The method of claim 7, further comprising:
    receiving, by the system, a first kernel comprising a first phase value that does not correspond to a phase of the request signal and a second kernel with a second phase value that does not correspond to the phase of the request signal from the kernel storage, wherein the sine of the combination of a first phase of the first phase value and a second phase of the second phase value does not equal zero, and
    generating, by the system, a third kernel based on the first kernel, the second kernel, and sine interpolation factors of the first phase and the second phase.

12. The method of claim 11, further comprising:
    employing, by the system, the third kernel.

13. A computer program product facilitating determining a quantum state of a qubit, the computer program product comprising a computer readable storage medium having program instructions embodied therewith, the program instructions executable by a processor to cause the processor to:
    receive, by the processor, in response to a request signal, an output signal representative of the quantum state of the qubit; and
    classify, by the processor, the quantum state of the qubit based on the output signal and a configuration determined by a characteristic of the request signal;
    wherein operations to classify the quantum state comprise operations to: employ, by the processor, a kernel from a kernel storage to generate a transformed output, wherein the kernel comprises a phase value that corresponds to a phase of the request signal.

14. The computer program product of claim 13, wherein operations to classify the quantum state comprise operations to:
receive, by the processor, the kernel from the kernel storage to generate a transformed output, wherein the kernel comprises a phase value that does not correspond to a phase of the request signal;
time shift, by the processor, values of the kernel, resulting in a time shifted kernel having a phase value that corresponds to the phase of the request signal; and
employ, by the processor, the time shifted kernel.

15. The computer program product of claim 13, wherein operations to classify the quantum state comprise operations to:
receive, by the processor, a first kernel comprising a first phase value not corresponding to a phase of the request signal and a second kernel comprising a second phase value not corresponding to the phase of the request signal from a kernel storage, wherein the sine of the combination of a first phase of the first phase value and a second phase of the second phase value does not equal zero;
generating, by the processor, a third kernel based on the first kernel, the second kernel, and sine interpolation factors of the first phase and the second phase; and
employ, by the processor, the third kernel.

* * * * *